United States Patent
Baudoin et al.

(10) Patent No.: US 10,837,867 B2
(45) Date of Patent: Nov. 17, 2020

(54) GROUND TESTING DEVICE FOR A TURBOMACHINE

(71) Applicant: SAFRAN AIRCRAFT ENGINES, Paris (FR)

(72) Inventors: Laurent Louis Robert Baudoin, Paris (FR); Josselin David Florian Regnard, Sainte Genevieve des Bois (FR)

(73) Assignee: Safran Aircraft Engines, Paris (FR)

( * ) Notice: Subject to any disclaimer, the term of this patent is extended or adjusted under 35 U.S.C. 154(b) by 155 days.

(21) Appl. No.: 16/183,981

(22) Filed: Nov. 8, 2018

(65) Prior Publication Data
US 2019/0137362 A1    May 9, 2019

(30) Foreign Application Priority Data

Nov. 8, 2017 (FR) .................................. 17 60488

(51) Int. Cl.
*G01M 15/02*    (2006.01)
*G01M 15/14*    (2006.01)
*F01D 25/28*    (2006.01)

(52) U.S. Cl.
CPC ........... *G01M 15/02* (2013.01); *F01D 25/285* (2013.01); *G01M 15/14* (2013.01); *F05D 2240/91* (2013.01); *F05D 2260/83* (2013.01)

(58) Field of Classification Search
CPC ..... G01M 15/02; G01M 15/14; F01D 25/285; F05D 2240/91; F05D 2260/83
See application file for complete search history.

(56) References Cited

U.S. PATENT DOCUMENTS

| 4,258,823 | A | * | 3/1981 | Ganz | ....................... | F02C 7/045 |
| | | | | | | 181/214 |
| 4,691,561 | A | * | 9/1987 | Ganz | ........................ | F02C 7/04 |
| | | | | | | 181/213 |
| 6,162,011 | A | * | 12/2000 | Gerhardt | ................... | B64F 1/26 |
| | | | | | | 415/1 |
| 7,207,213 | B2 | * | 4/2007 | Gerhardt | ................... | B64F 1/26 |
| | | | | | | 73/112.01 |
| 7,565,269 | B2 | * | 7/2009 | Parfitt | ..................... | G01L 5/133 |
| | | | | | | 702/182 |
| 8,006,544 | B2 | * | 8/2011 | Holmes | ................. | G01M 15/14 |
| | | | | | | 73/112.01 |
| 10,373,388 | B2 | * | 8/2019 | Colson | .................... | G06T 7/001 |
| 10,458,272 | B2 | * | 10/2019 | Tran | ...................... | G01M 15/02 |

(Continued)

FOREIGN PATENT DOCUMENTS

EP    3 009 826 A1    4/2016
WO    2008/088797 A1    7/2008

OTHER PUBLICATIONS

Search report dated Jul. 3, 2018, from corresponding French Patent Application No. 1760488, filed Nov. 7, 2018 (2 pages).

*Primary Examiner* — Freddie Kirkland, III
(74) *Attorney, Agent, or Firm* — Bookoff McAndrews, PLLC

(57) ABSTRACT

A ground testing device for a turbomachine, including an aircraft engine (12) extending axially from an air inlet to a nozzle, a shroud (20) having an axis of revolution (A) and surrounding at least partially the engine (12) so as to create an annular air flow between the engine (12) and the shroud (20) when the engine (12) is in operation, and a framework (22) allowing the shroud (20) to be supported.

12 Claims, 2 Drawing Sheets

(56) References Cited

U.S. PATENT DOCUMENTS

| | | | |
|---|---|---|---|
| 2009/0133381 A1* | 5/2009 | Holmes | G06F 30/15 60/204 |
| 2011/0048847 A1* | 3/2011 | Helgeson | F01N 1/084 181/220 |
| 2016/0108753 A1* | 4/2016 | Tran | F01D 21/003 415/1 |

* cited by examiner

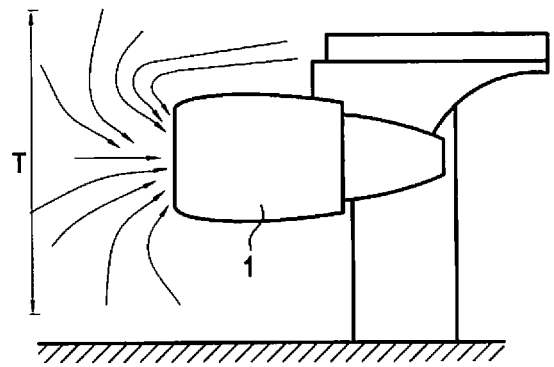
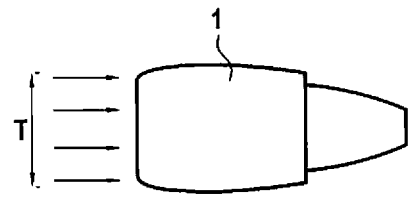
FIG.1A
FIG.1B
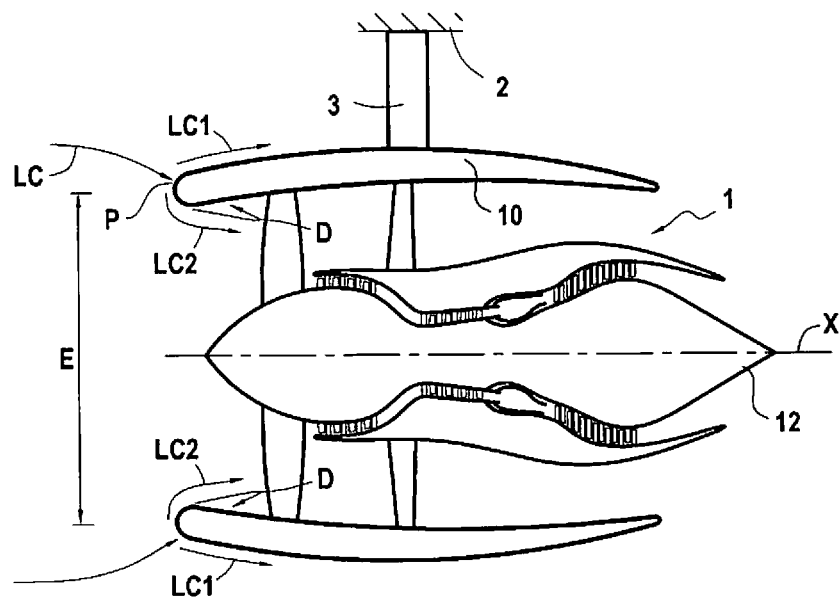
FIG.2

GROUND TESTING DEVICE FOR A TURBOMACHINE

CROSS-REFERENCE TO RELATED APPLICATION

This application claims the benefit of priority to French Patent Application No. 1760488, filed on Nov. 8, 2017, the entirety of which is incorporated by reference herein.

FIELD OF THE INVENTION

The present invention relates to the field of aeronautical turbomachines, and more precisely a device for ground test beds of aeronautical turbomachines.

PRIOR ART

Before their integration into aircraft such as airplanes, the engines of these aircraft must be subjected to prior testing intended to test the aerodynamics and acoustics of these engines. These tests are carried out on the ground, on test beds provided for this purpose. The conditions of these ground tests differ from conditions existing in flight in that the ambient air, surrounding the engine, is static or quasi static. The effect of advance, due to the displacement of the aircraft in flight, is therefore not reproduced on the ground. Consequently, conditions existing on the ground are not representative, from the aerodynamic and acoustic points of view, of those existing in flight. The stream tube in particular, designating the corridor created by the set of streamlines of air entering the engine, is much larger on the ground than in flight. The angle of attack of these streamlines at the air inlet of the engine, defined by the fairing of the engine, is therefore also different. Consequently, the position of the stagnation point, designating the point of engine inlet where the air flow separates on either side of the wall of the fairing, is different when the tests are carried out on the ground.

To compensate for this disadvantage, and to obtain a stream tube representing conditions in flight, tests carried out on the ground generally use aerodynamic horns, consisting of sleeves attached to the upstream end of the engine so as to create artificially a corridor guiding the air to the engine. In this manner, the angle of attack of the streamlines approaches real conditions more closely. Nevertheless, this equipment does not represent the real geometry of the engine. This change of shape modifies in particular the acoustic conditions of the flow. The flow is also not totally representative of real conditions.

Hence there exists a need for a simple and low-cost device allowing ground tests to be carried out on aircraft engines, under conditions representative of real conditions in flight, both from an aerodynamic and from an acoustic point of view.

PRESENTATION OF THE INVENTION

The present disclosure relates to a ground testing device for a turbomachine, including:
an aircraft engine extending axially from an air inlet to a nozzle;
a shroud having an axis of revolution and surrounding at least partially the engine so as to create an annular air flow between the engine and the shroud when the engine is in operation;
a framework allowing the shroud to be supported.

In the present disclosure, the terms "internal" and "external" are defined with respect to the main axis of the turbomachine; furthermore, the terms "upstream" and "downstream" are defined with respect to the direction of flow of the fluid passing through the turbomachine.

The upstream end of the engine, in other words its leading edge, defines the air inlet. The downstream end, in other words its trailing edge, defines the nozzle.

When the engine is in operation, the air present around the turbomachine is aspired by the air inlet, then is expelled through the nozzle.

The shroud can be a sleeve of circular or substantially circular cross section, surrounding the engine at least partially. The shroud includes an upstream end positioned, preferably, at the same position along the axis of the engine as the upstream end of the engine. This disposition makes it possible to improve the masking phenomenon, i.e. the acoustic attenuation of the engine due to the presence of the shroud. The shroud also includes a downstream end which can extend farther downstream than the downstream end of the engine. The shroud is disposed around the engine so as to create an annular volume between the external wall of the engine and the internal wall of the shroud.

When the engine of the aircraft is in operation, the air expelled at the nozzle of the engine creates, due to the fact of the downstream presence of the shroud, a reduced pressure at the downstream end of the annular volume between the engine and the shroud. This reduced pressure creates, by aspiration, a flow of air in this annular volume, between the upstream end and the downstream end of the engine.

During tests carried out on the ground, the presence of the shroud around the engine therefore allows the creation of a flow of air along the external wall of the engine between its upstream and downstream ends. This flow thus allows streamlines incident at the air inlet to have an angle of attack analogous to that existing under flight conditions. The position of the stagnation point in particular can also be radially offset toward the interior. Consequently, the presence of the shroud allows ground conditions to be obtained representing flight conditions, both from the aerodynamic an acoustic points of view. Furthermore, this device constitutes a passive solution thanks to the aspiration effect created by the reduced pressure at the nozzle, requiring no additional active element to create artificially a flow of air along the external wall of the engine.

In certain embodiments, the shroud surrounds the engine over its entire circumference.

Consequently, the annular volume between the engine and the shroud has no discontinuity.

In certain embodiments, the shroud has a length greater than or equal to the length of the engine along the axis of rotation of the engine.

In certain embodiments, the shroud extends axially farther downstream than the engine.

Consequently, the reduced pressure created at the nozzle of the engine is greater. The effect of the aspiration obtained allows a flow of air to be effectively induced along the external wall of the engine.

In certain embodiments, the ratio of the surface area of an inlet cross section of the shroud to the surface area of an inlet cross section of the engine is comprised between 1 and 3.

In certain embodiments, the ratio of the surface area of an outlet cross section of the shroud to the surface area of an outlet cross section of the engine is comprised between 1 and 3.

The inlet cross section of the shroud is the surface area defined by the upstream end, in other words the leading edge, of the shroud. The inlet cross section of the engine is the surface defined by the leading edge of the engine. The outlet cross section of the shroud is the surface defined by the downstream end of the shroud. The outlet cross section of the engine is the surface defined by the trailing edge, in other words the nozzle, of the engine.

The value of these ratios between the inlet and outlet cross sections of the shroud and of the engine makes it possible to optimize the profile of the annular flow around the engine, and thus to obtain flow around the engine representing flight conditions.

In certain embodiments, the shroud has, along its axis of revolution, between its inlet cross section and its outlet cross section, a maximum interior diameter, the maximum interior diameter being greater than the diameter of the inlet cross section and the diameter of the outlet cross section.

The profile of the shroud, along its axial direction, is therefore not cylindrical, but has a domed profile. In other words, the shroud has a "divergent-convergent" profile. The annular volume existing between the engine and the internal surface of the shroud therefore has, along the main axis of the turbomachine, a divergent portion until the maximum interior diameter, then a convergent portion until the nozzle. This shape allows obtaining a flow acceleration effect around the engine.

In certain embodiments, the ratio of the surface area of the cross section of the shroud corresponding to the maximum interior diameter of the shroud, to the surface area of the cross section of the engine corresponding to the maximum diameter of the engine is comprised between 1 and 2.

The maximum diameter of the engine corresponds to the maximum external diameter thereof between the inlet cross section and the outlet cross section, along the main axis of the turbomachine. The value of this ratio allows the shape of the annular volume between the engine and the shroud to be optimized, and thus improves the acceleration effect of the annular flow around the engine.

In certain embodiments, the shroud is supported by the framework in a movable manner, so that the axis of revolution of the shroud can be inclined with respect to the axis of rotation of the engine.

The shroud can for example be attached to the framework by means of a pivot connection. Thus, the axis of revolution of the shroud, initially coincident with the axis of rotation of the engine, can be inclined with respect to it by means of the pivot connection. This makes it possible to create an asymmetry of the annular volume around the engine, hence an asymmetry in the annular flow. The latter allows obtaining a flow profile around the engine representing flight conditions, by reproducing the effects of inclination of the aircraft.

In certain embodiments, the shroud is supported by the framework in a movable manner, so that the shroud can be displaced axially with respect to the engine, along the axis of rotation of the engine.

The shroud can thus be displaced axially with respect to the engine, the axis of revolution of the shroud and the axis of rotation of the engine being coincident.

In certain embodiments, the shroud can also be displaced axially with respect to the engine, the axis of revolution of the shroud being simultaneously inclined with respect to the axis of rotation of the engine. The axial displacement of the shroud with respect to the engine makes it possible to influence the position of the stagnation point, and thus to observe different conditions representing flight conditions. The position of the shroud with respect to the engine, allowing a position of the stagnation point representative of a desired flight condition, can be determined by calculations or by measurements for example.

In certain embodiments, the device includes a head loss member configured to cause head losses over at least a portion of the annular flow.

For example, the head loss member can be a grate installed in the interior of the annular volume between the engine and the shroud. The presence of this grate causes head losses causing turbulence in the annular flow, and thus an asymmetry thereof, representing flight conditions.

In certain embodiments, the shroud includes a main portion and at least one orientable flap disposed at a downstream end of the shroud, the at least one orientable flap being configured to pivot with respect to the main portion.

The presence of this orientable flap allows, by modifying its orientation with respect to the rest of the shroud, varying the existing reduced pressure at the downstream end of the shroud. This variation allows the local modification of the effect of aspiration, and therefore the speed of the annular flow, creating an asymmetry thereof representing flight conditions.

In certain embodiments, the aircraft engine is a fairinged turbofan, the shroud surrounding the engine's fairing.

BRIEF DESCRIPTION OF THE DRAWINGS

The invention and its advantages will be better understood upon reading the detailed description given hereafter of different embodiments of the invention given by way of non-limiting examples. This description refers to the appended pages of figures, in which:

FIGS. 1A and 1B show streamlines incident at the air inlet of an engine, respectively on the ground and in flight.

FIG. 2 shows an aircraft engine disposed on a test bed according to the prior art, in the absence of an aeronautical horn.

DETAILED DESCRIPTION OF EXEMPLARY EMBODIMENTS

Figure 3:
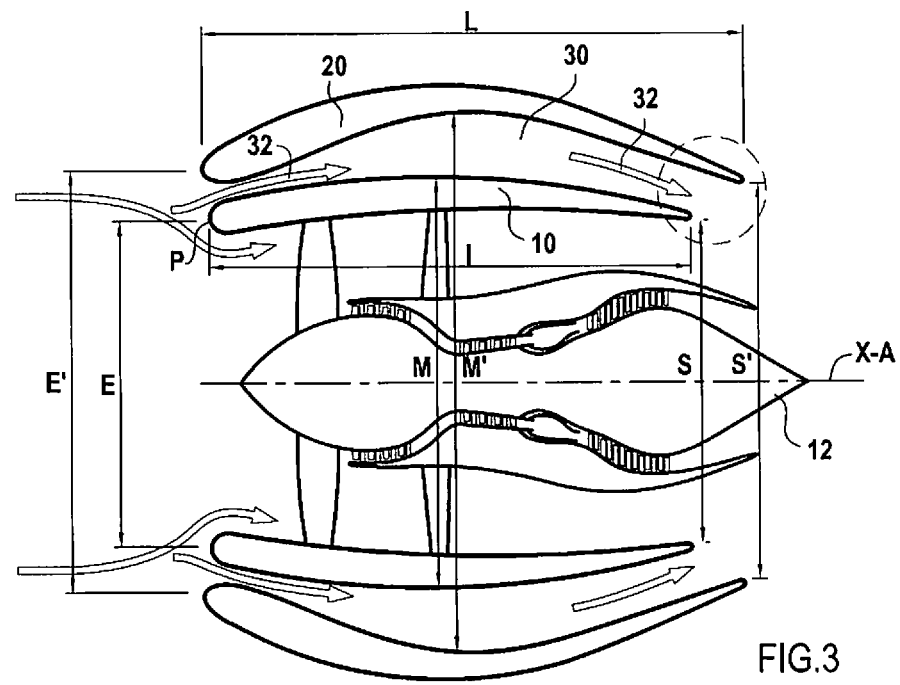
FIG. 3 shows schematically a testing device according to one exemplary embodiment of the invention.

In the example described below, the aircraft engine is a turbomachine. Moreover, the term "longitudinal" and its derivatives are defined with respect to the main direction of the turbomachine considered: the terms "radial," "interior," "exterior" and their derivatives are defined with respect to the main axis of the turbomachine; finally the terms "upstream" and "downstream" are defined with respect to the direction of flow of the fluid passing through the turbomachine. Also, unless otherwise indicated, the same reference symbols on different figures designate the same features.

FIG. 1A shows schematically the incident streamlines (arrows in FIG. 1A) at a turbomachine 1, when the turbomachine is operating on the ground. The turbomachine 1 being immobile with respect to the ground, the air surrounding the turbomachine is substantially static. The stream tube T, containing all these streamlines, if consequently very large. In fact, the turbomachine in operation aspires air situated all around it. Conversely, the effect of advancement caused by the displacement of the turbomachine in flight implies a smaller stream tube T, as illustrated in FIG. 1B. In fact, in this case, due to its displacement, the turbomachine aspires essentially the air present on the trajectory of its inlet cross section, and no longer the air situated at the exterior of it. It follows that streamlines are substantially parallel to the main axis of the turbomachine.

FIG. 2 shows a turbomachine 1 disposed on a ground test bed, in the absence of an aeronautical horn. The turbomachine 1 is carried by a fixed structure 2 by means of a gantry 3. The turbomachine includes a fairing 10 surrounding an engine 12 with axis of rotation X. The upstream end of the fairing 10 defines an air inlet E, the air inlet being defined by the leading edge of the fairing. The streamlines LC incident at the air inlet E are illustrated. Each of them separates into two streamlines LC1 and LC2 when reaching the upstream end, i.e. the leading edge, of the fairing 10. Each of these two lines of separation LC1 and LC2 passes respectively at the exterior and in the interior of the turbomachine 1.

The point of the fairing 10 corresponding to the position where the streamlines LC are split in two is the stagnation point P, designating a point where the air speed is locally zero. During ground testing, and in the absence of a horn, the stagnation point P is situated at a radially external point of the fairing 10. The position of this stagnation point, and consequently the angle of incidence of the streamline LC2 passing into the interior of the turbomachine 1, causes a considerable loss of pressure D at the air inlet, likely to perturb the operation of the turbomachine. The position of this stagnation point P is also not representative of real flight conditions.

FIG. 3 shows the turbomachine of FIG. 2, around which is disposed a shroud 20. The shroud 20 has axial symmetry around an axis A. In FIG. 3, the axis A is conflated with the axis X of rotation of the engine 12. In this example, the shroud 20 has a shape analogous to that of the fairing 10, particularly a substantially cylindrical shape having a domed external surface. The thicknesses of the shroud 20 and of the fairing 10 in a radial direction are also substantially equivalent. In this example, the length L of the shroud 20, along the axis A, is greater than the length l of the fairing 10. Nevertheless, the length L of the shroud 20 can be comprised between 0.8 and 1.5 times the length l of the fairing 10. Moreover, the upstream end of the shroud 20 is aligned, in a radial direction, with the upstream end of the fairing 10. On the other hand, the downstream end of the shroud 20 is situated further downstream than the downstream end of the fairing 10, along the axis A.

The internal diameter of the shroud 20 increases in an upstream-downstream direction between the upstream end of the shroud 20 and a maximum value, then drops between the maximum value and the downstream end. More precisely, the ratio E'/E of the inlet cross section E' of the shroud 20 to the inlet section E of the fairing is comprised between 1 and 3, preferably between 1.5 and 2.5, more preferably between 1.8 and 2.2. The ratio S'/S of the outlet cross section S' of the shroud 20 to the outlet section S of the fairing is comprised between 1 and 3, preferably between 1.5 and 2.5, more preferably between 1.8 and 2.2. The ratio M'/M of the cross section M' of the shroud 20, corresponding to the maximum internal diameter of the shroud 20, to the corresponding cross section M of the fairing is comprised between 1 and 2, preferably between 1.2 and 1.8, more preferably between 1.4 and 1.6.

The presence of this shroud 20 around the fairing 10 of the turbomachine makes it possible to create a volume 30 with a substantially annular shape between the external surface of the fairing and the internal surface of the shroud 20. In addition, when the engine 12 of the turbomachine is in operation, the presence of the shroud 20 allows a reduced pressure to be created at the downstream end of the shroud 20 and of the fairing 10, illustrated by the dotted circle in FIG. 3. This reduced pressure generates, by the effect of aspiration, a longitudinal flow around the fairing 10 in the annular volume 30 (see arrows 32 in FIG. 3), showing the effect of advancement of the turbomachine 1 under real conditions, in flight. This flow around the fairing 10 allows the shape of the stream tube incident on the turbomachine, and therefore the inclination of the incident stream lines, to be modified. Consequently, the stagnation point P is disposed more toward the interior of the turbomachine, compared to a configuration in which the shroud 20 is not present.

Figure 4:
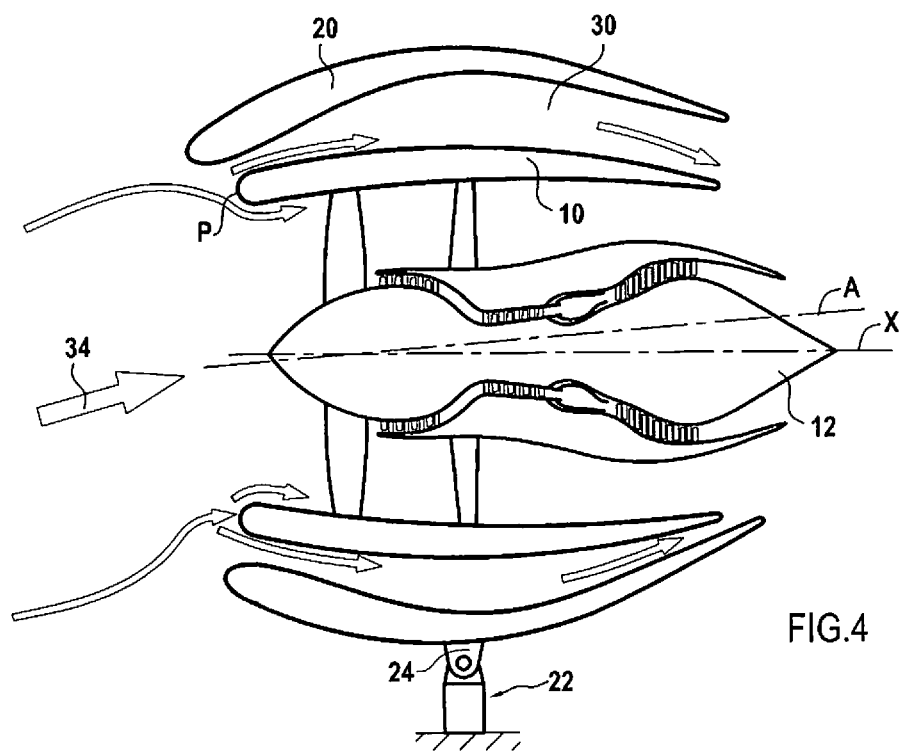
FIG. 4 shows the device of FIG. 3, in which the shroud is inclined with respect to the engine.

FIG. 4 shows the device of FIG. 3, in which the shroud 20 is inclined with respect to the turbomachine 1. The shroud 20 is attached in a movable manner to a framework 22, by means of a pivot connection 24. The shroud 20 is thus attached to the framework 22, independently of the shroud 20, the latter being attached to the fixed structure 2. The shroud 20 can therefore be oriented with respect to the framework 22, electrically or manually for example, in such a manner as to incline the axis A of the shroud 20 with respect to the axis X of the fairing 10. This inclination of the shroud 20 has the effect of creating an asymmetry of the annular volume 30 around the fairing 10, hence an asymmetry in the flow around it. An asymmetry of this type can exist under real flight conditions, when the turbomachine is inclined with respect to the horizontal, for example. The fact of inclining the shroud 20 with respect to the fairing 10 makes it possible to reproduce these conditions, by creating an incidence effect of the upstream streamlines (see arrow 34 in FIG. 4).

Although the present invention has been described by referring to specific exemplary embodiments, it is clear that modifications and changes can be carried out on these examples without departing from the general scope of the invention as defined by the claims. In particular, the individual features of the different embodiments illustrated/mentioned can be combined into additional embodiments. Consequently, the description and the drawings must be considered in an illustrative sense, rather than a restrictive one.

The invention claimed is:

1. A ground testing device for a turbomachine, including:
   an aircraft engine extending axially from an air inlet to a nozzle;
   a fairing surrounding the engine;
   a shroud having an axis of revolution and surrounding at least partially the fairing, so as to create an annular air flow between the fairing and the shroud when the engine is in operation; and
   a framework allowing the shroud to be supported.

2. The device according to claim 1, wherein the shroud surrounds the fairing over an entire circumference of the fairing.

3. The device according to claim 1, wherein the shroud has a length greater than or equal to a length of the fairing along an axis of rotation of the engine.

4. The device according to claim 1, wherein the shroud extends axially farther downstream than the fairing.

5. The device according to claim 1, wherein a ratio of a surface area of an inlet cross section of the shroud to a surface area of an inlet cross section of the fairing is between 1 and 3.

6. The device according to claim 1, wherein a ratio of a surface area of an outlet cross section of the shroud to a surface area of an outlet cross section of the fairing is between 1 and 3.

7. The device according to claim 1, wherein the shroud has, along the axis of revolution, between an inlet cross section of the shroud and an outlet cross section of the shroud, a maximum interior diameter, the maximum interior diameter being greater than a diameter of the inlet cross section and a diameter of the outlet cross section.

8. The device according to claim 1, wherein a ratio of a surface area of a cross section of the shroud corresponding to a maximum interior diameter of the shroud, to a surface area of a cross section of the fairing corresponding to a maximum diameter of the fairing is between 1 and 2.

9. The device according to claim 1, wherein the shroud is supported by the framework in a movable manner, so that the axis of revolution of the shroud can be inclined with respect to an axis of rotation of the engine.

10. The device according to claim 1, wherein the shroud is supported by the framework in a movable manner, so that the shroud can be displaced axially with respect to the fairing, along an axis of rotation of the engine.

11. The device according to claim 1, further including a head loss member configured to cause head losses over at least a portion of the annular flow.

12. The device according to claim 1, wherein the aircraft engine is a fairinged turbofan.

\* \* \* \* \*